Oct. 22, 1968  J. CASELLAS  3,406,520
HYDRAULIC FORCE BOOSTERS FOR BRAKING EQUIPMENT AND THE LIKE
Filed Dec. 23, 1966  2 Sheets-Sheet 1

INVENTOR
J. CASELLAS
BY Jackford Orlow
ATTORNEYS

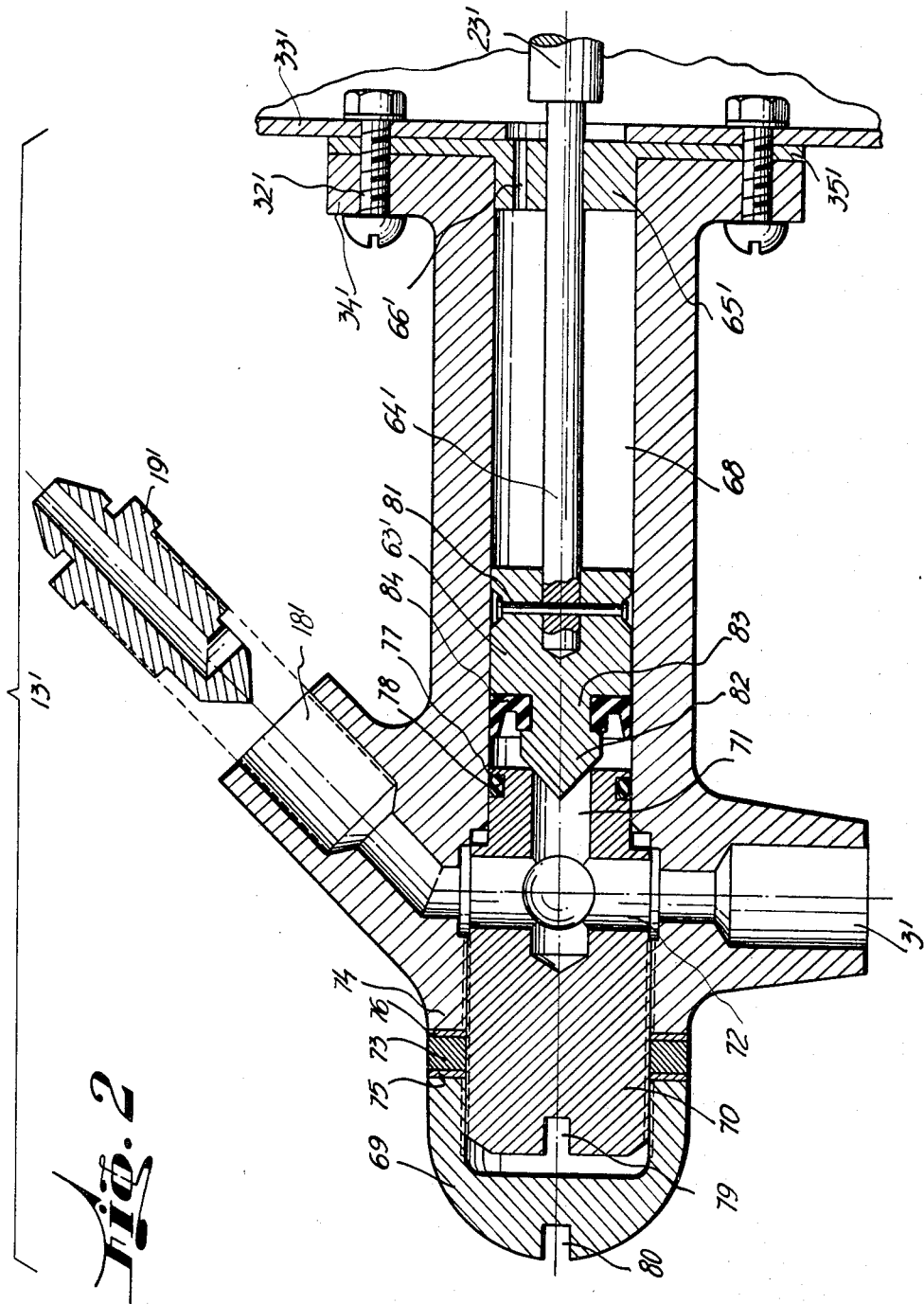

United States Patent Office 3,406,520
Patented Oct. 22, 1968

3,406,520
HYDRAULIC FORCE BOOSTERS FOR BRAKING EQUIPMENT AND THE LIKE
Juan Casellas, Mendoza, Argentina, assignor to Clemente F. Martin, Mendoza, Argentina
Filed Dec. 23, 1966, Ser. No. 604,261
3 Claims. (Cl. 60—54.5)

ABSTRACT OF THE DISCLOSURE

A hydraulic force booster connectable into a hydraulic circuit, and having two pistons of different diameters, one of which has associated valve means controlled by the other piston, for increasing the force exerted on the fluid of the hydraulic circuit once the pressure thereof overpasses a predetermined value.

---

The present invention refers to a hydraulic booster, preferably to be used in the hydraulic braking equipment of a vehicle.

It is to be understood that the expression "hydraulic booster" used in this specification and in the annexed claims relates to a device for amplifying a hydraulic force, and which does not require the use of a servo-mechanism in order to obtain the desired effect.

The hydraulic booster of the present invention relies basically, in order to increase the force exerted by the brake pedal on the slave cylinders of the wheels of a vehicle, on the hydraulic force generated in the master cylinder, that is to say it does not require a separate vacuum generating nor pressure generating installation, as in the case in most servo-mechanisms known in the art and used in braking equipments. These known arrangements have the inconvenience, specially in those vehicles equipped with Diesel engines or two stroke motors, that the vacuum which may be generated in certain parts of the motor, is negligible and this makes the installation of a disproportionally sized servo-mechanism necessary, which obviously is not a practical proposition. Bearing this in mind and in accordance with the present invention, a hydraulic booster has been conceived which in spite of not requiring any external source of vacuum or air pressure, offers beneficial effects similar to those provided by the well known servo-mechanisms used in braking equipments and without having external dimensions which are out of proportion with respect to the remaining components associated therewith.

Accordingly, one object of the present invention is to provide a device connectable to a hydraulic braking circuit and by means of which the braking force generated therein may be increased without having to increase the effective length of displacement of the brake pedal, and without requiring the use of a servo-mechanism.

Another object of the present invention is to provide an economic and easily installable device, to be used particularly in those vehicles which do not provide an effective air pressure or vacuum generating arrangement.

In order to facilitate the comprehension of the present invention, reference will now be made to two specific embodiments, by way of example, to the accompanying drawings, wherein:

FIG. 2 is a longitudinal cross section of an alternative embodiment of one part of the device illustrated in FIG. 1.

Figure 1:
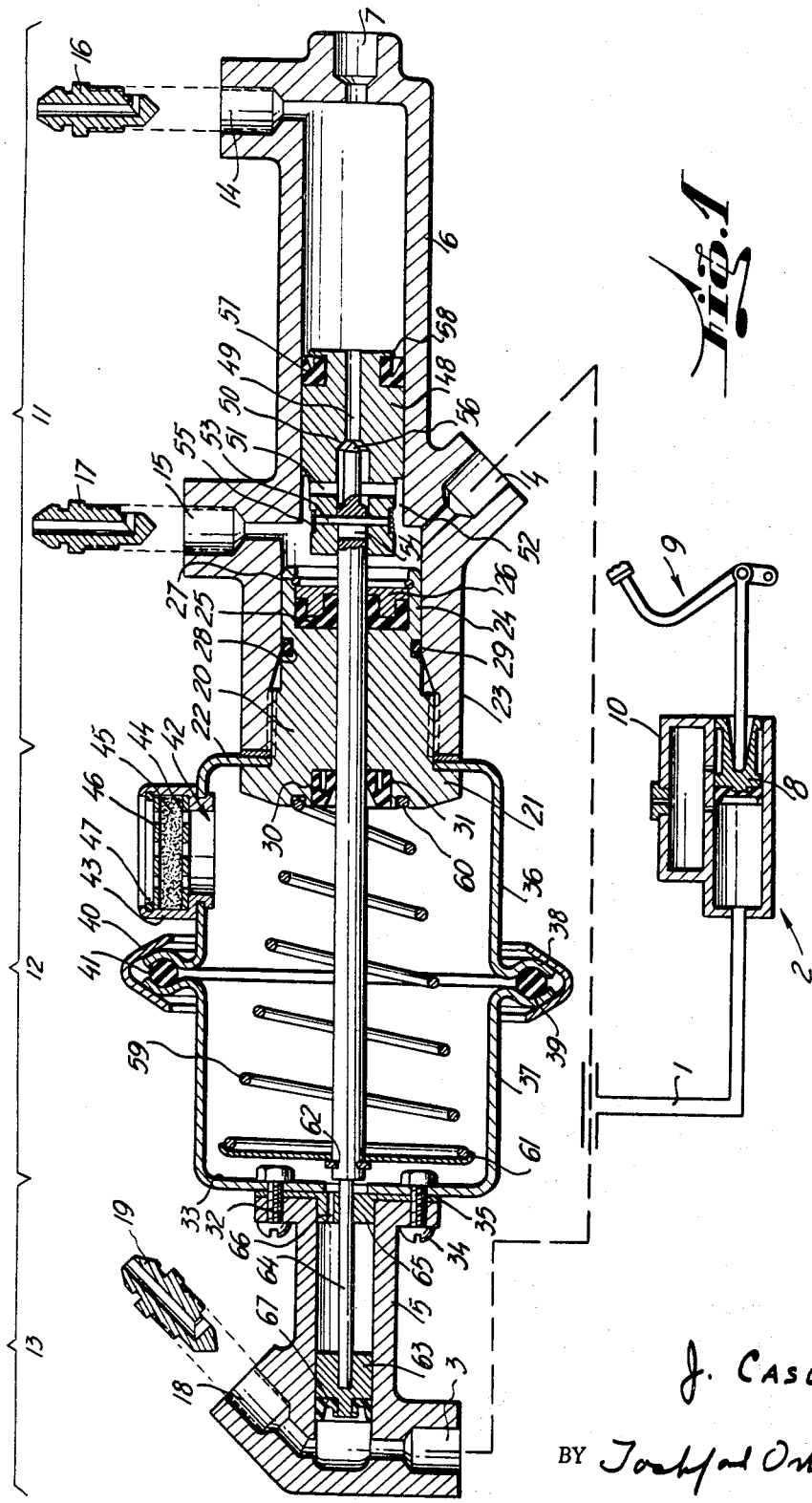
FIG. 1 is a longitudinal cross section of the hydraulic booster of the present invention, and wherein its inter-connection with the master cylinder of the braking equipment has been schematically represented.

As may be seen from FIG. 1, the device of the present invention is connectable to the discharge conduit 1 of a master cylinder 2, by means of a first port 3 and a second port 4 defined in corresponding end portions of a first cylinder 5 and a second cylinder 6. Second cylinder 6 has defined at its other end portion a third port 7 connectable to a slave cylinder (not shown). As is well known in the art, most hydraulic brake actuating arrangements comprise a master cylinder 2 within which a piston 8 is slidably housed and connected to a brake pedal 9. The master cylinder 2 has associated therewith on its upper part a container 10 containing a reserve of brake fluid which tends to maintain the hydraulic circuit permanently supplied therewith.

In accordance with the preferred use of the invention, that is to say, for the brakes of the wheels of a vehicle, third port 7 is connected to a distributor pipe which connects this port 7 to all the slave cylinders of the respective brakes.

In the embodiment illustrated, the device of the present invention comprises a housing arrangement formed of three sections 11, 12, 13. Section 11 having the aforementioned ports 4 and 7 defined therein, one at each end portion thereof. Furthermore, section 11 has two further ports 14 and 15 adapted to be used when it is desired to extract air which may remain trapped within this portion of the hydraulic circuit, during the initial assembly thereof or after any repair work has been undertaken.

Ports 14 and 15 are normally closed by means of conveniently designed plugs 16 and 17. Similarly, section 13 has defined therein the aforementioned port 3 as well as a port 18 adjacent thereto, and generally closed by means of a plug 19 adapted to be used for purging the air out of section 13 in a manner similar to that carried out with respect to section 11.

Section 11 is connected to section 12 by means of a partially screw threaded plug 20, which by means of a radially outwardly extending portion 21 retains annular portion 22 which corresponds to an extension of section 12, against the end of section 11. Plug 20 has a perforation defined axially therethrough, and through which there extends a valve rod 23 for the reasons to be explained later on.

Plug 20 furthermore includes at one end thereof, a recess 24 within which a sealing member 25 is housed and retained in place by means of a washer 26 and a retaining ring 27. Plug 20 also has an annular recess 28 within which is mounted an annular seal 29 which prevents the hydraulic interconnection between sections 11 and 12.

At the other end of plug 20 there is defined an annular recess 30 within which an annular sealing member 31 is positioned and which serves to provide a sealing contact against valve rod 23.

Referring now to sections 12 and 13 these are rigidly secured one to the other by means of screws 32 extending through flanges 33 and 34 corresponding to extensions of sections 12 and 13 respectively.

Between flanges 33 and 34 an annular sealing member 35 is placed in order to provide the necessary hermetic contact therebetween.

Section 12 is formed by two cup shaped members 36 and 37 each including annular flanges 38 and 39 held in assembled position by means of a brace 40 of V-shaped metal sheeting. Between annular flanges 38 and 39 a ring shaped elastic member 41 is positioned in order to keep these components substantially rigid one with the other.

It is to be noted that by means of brace 40, the assembly and disassembly of both cup shaped portions 36 and 37 is facilitated.

For the reasons which will become evident from the remainder of this description, the lateral wall of the cup shaped portion 36 has a perforation 42 in which is mounted an annular housing 43 wherein there is mounted a perforated member 44 on which a filtering component 45 is positioned and held in such position by a further perforated element 46, a retaining ring 47 being fitted within an annular internal recess defined within housing 43 in order to hold this air filtering assembly in position.

Section 11 includes the aforementioned cylinder 6 within which a piston 48 is slidably mounted and which has an axial perforation 49 defined therein. Perforation 49 has a first portion of reduced diameter and a second portion of larger diameter, there being defined between both portions a valve seat 50 the object of which will be explained hereinbelow. Axial perforation 49 communicates second port 4 with third port 7. Piston 48 has also defined therein at least one radial passage 51 in communication with the portion of increased diameter of axial perforation 49 and which, at its other end leads into an annular recess 52 defined on part of the peripheral portion of piston 48. Piston 48 has defined therethrough a perforation which houses a pin 53 which extends through the aforementioned valve rod 23; it is to be noted that rod 23 has a perforation 54 defined therethrough, and through which pin 53 extends. So that there may be relative movement between rod 23 and pin 53 the diameter of perforation 54 is larger than the diameter of pin 53. Pin 53 is held within its radial housing by means of a spring 55 placed within a corresponding annular recess defined in the periphery of annular recess 52 of piston 48. Rod 23 has defined at one end thereof a valve head 56 adapted to cooperate with valve seat 50 in order to define a sealing contact therebetween.

Furthermore, piston 48 has defined on its front face an annular recess within which is retained an annular sealing member 57 providing the necessary hermeticity between the opposite faces of piston 48. It is to be noted that in order to place annular sealing member 57 within the recess housing it, it is sufficient to press it over the radially outwardly extending portion 58, overcoming its normal elastic resistance.

A conical spring 59 is housed within section 12 and rests at one end within an annular recess 60 defined in plug 20, its other end resting against a plate shaped member 61 held in position by means of a ring 62 which fits within an annular recess defined in rod 23. It is to be noted that spring 59 tends to separate valve head 56 from valve seat 50.

Referring now to section 13, cylinder 5 is defined therein and slidably houses a piston 63 rigidly connected to a shaft 64 which is an extension of rod 23, but has a reduced diameter with respect thereto. The aforementioned sealing member 35 includes a bushing portion 65 through which shaft 64 extends. Bushing 65 furthermore has a perforation 66 extending therethrough and communicating section 12 with the chamber defined by the right hand face of piston 63 (as seen in FIG. 1) and cylinder 5, and by means of which the generation of air pressure therein is avoided.

First piston 63 has mounted, on its left face (as seen in FIG. 1) a sealing member 67 providing the necessary hermeticity between one and the other faces thereof.

The operation of the embodiment illustrated in FIG. 1 will now be described. On exerting a force on brake pedal 9, piston 8 will be urged to the left of FIG. 1 displacing in this way the fluid through discharge conduit 1 and ports 3 and 4. Inasmuch as the pressure exerted on pedal 9 does not suffice to overcome the effects of spring 59, piston 63 will not be moved by the hydraulic pressure generated and therefore valve head 56 will not seat against valve seat 50 and the communication between ports 4 and 7 will be maintained. Accordingly, the brake fluid will be transferred through second port 4, recess 52, perforation 51, perforation 49, third port 7 and into the individual slave cylinders of the brakes, urging in this way the brake shoes to enter into contact with their respective brake drums.

On further applying the brakes, that is to say, on increasing the force exerted upon pedal 9, a greater quantity of liquid will be displaced and thereby the force exerted upon piston 63 will overcome the resistance of spring 59 and a sealing contact between valve head 56 and valve seat 50 will be established, thereby inhibiting the passage of fluid through perforation 49. Under these conditions, on further exerting pressure upon pedal 9, the liquid within the hydraulic system may now no longer pass through perforation 49 towards the slave cylinders, but will exert a force upon sealing member 67 of first piston 63 as well as on second piston 48, moving both towards the third port 7. In this way the force exerted on pedal 9 will now be totally applied against the second piston 48 inasmuch as part thereof will act directly upon piston 48 while the remaining part will exert its effect upon first piston 63 which will transmit, by means of rod 23, the force received, to piston 48. Bearing in mind the diameter of first piston 63, which is less than the diameter of piston 48, the force applied on pedal 9 will be increased due to the effect of the reduced area of first piston 63. In this way, upon the now rigid combination of pistons 63 and 48 moving towards third port 7, the liquid between second piston 48 and the slave cylinders will be displaced with a larger force and therefore the braking effect will be more pronounced without the operator having had in any way to exert more force on the pedal to obtain such a result.

The return cycle for the brake fluid from the slave cylinders to the master cylinder 2 will obviously be carried out when brake pedal 9 is released whereby, due to the force exerted by spring 59 upon plate 61, rod 23 and piston 63 will be pushed leftwards as seen in FIG. 1 (opening valve 56) and the passage of fluid through piston 48 being thereby established. Upon rod 23 returning to the position illustrated in FIG. 1, the wall defining perforation 54 will abut against pin 53 dragging in this way piston 48 also towards the position illustrated in FIG. 1. The fluid pressure acting in the slave cylinder will return the fluid to master cylinder 2.

Reference will now be made to the alternative embodiment illustrated in FIG. 2, wherein the same reference numerals have been used for analogous or similar parts, as those illustrated in FIG. 1, but with a prime having been added thereafter.

In those cases in which the slave cylinders of the brakes require a greater fluid force for their efficient actuation, it is necessary to provide a larger surfaced piston and to this effect piston 63 may have to be of a diameter equal to or larger than that of piston 48.

In this case, and due to the larger cross section of piston 63, a relatively large force will be transmitted thereby and due to which, the effect of spring 59 will be soon overcome and accordingly valve 56-50 will be closed before necessary and therefore the booster will start working before the brake shoes have come into contact with the brake drum. It is to be noted, that basically, the master cylinder must first carry the brake shoes into contact with the brake drum before the booster starts operating. In this way a compound effect is achieved.

This compound effect can be explained as follows: It is known to those skilled in the art that the ideal effect to be achieved in any hydraulic braking arrangement is unavoidably dependent on a double piston circuit. This circuit in general provides a first piston of large diameter which operates during the initial application of the brakes and serves to carry the brake shoes up into contact with the brake drum with a minimum displacement of the pedal. A second piston of smaller diameter is provided to operate after the first piston in order that the displacement of the brake pedal be lengthened enabling in this way the conductor to carry out a smoother braking of the vehicle.

In accordance with both embodiments of this invention, this compound effect is achieved and to which end there is provided on piston 63' a portion of reduced diameter which will be described hereinbelow. By means of this alternative, it is also desirable to provide means adapted to vary the effective length of displacement of the brake pedal in accordance with the particular requirements of the driver.

According to this arrangement, within section 13' there is defined a cylinder 68 closed by an internally threaded cup shaped member 69 mounted over an externally threaded plug shaped member 70 defining a longitudinal axial perforation 71 which does not extend through its whole length, and radial perforations 72 in register with ports 3' and 18'. A nut 73 is screwed over plug shaped member 70 between end portion 74 and cup shaped member 69. Copper washers 75 and 76 are inserted between end portion 74 and nut 73 and between nut 73 and member 69 in order to form a hermetic seal. Member 70 is screwed into end portion 74. Member 70 has an annular recess 77 defined therein and housing an elastic ring 78 providing a hermetic seal with the wall of cylinder 68.

The end of plug shaped member 70 housed within internally threaded member 69 is provided with a tool receiving recess 79 which may be used to rotate plug 70 when it is desired to vary its longitudinal position within section 13'. It will be evident, that to this end it is first necessary to withdraw internally threaded member 69 and to this effect it is also provided with a tool receiving recess 80.

Within cylinder 68 there is mounted a slidable piston 63' connected to shaft 64' by means of a pin 81 of a length less than the diameter of piston 63', in order to not damage the internal face of cylinder 68 due to the effect of the hard metal of which the pin 81 is made.

The left hand end of piston 63' (as seen in FIG. 2) includes a cone shaped portion 82 aligned with perforation 71 in order to define therewith a valve seat. Around portion 83 of cone shaped portion 82 there is mounted an annular sealing member 84 in order to provide the necessary hermeticity between one and the other faces of piston 63'.

This cone shaped portion provides the portion of reduced diameter of piston 63' to which reference has been previously made. It is to be noted that due to the smaller cross section of cone shaped portion 82 and perforation 71, the force exerted thereon when pedal 9 is actuated, is smaller than the force that would be exerted on piston 63' if the hydraulic pressure were applied directly thereto and therefore it is necessary to exert a larger force on pedal 9 in order to overcome the effect of spring 59. Therefore, the displacement of the pedal is lengthened, and the fluid is enabled to pass from the master cylinder 2 through port 4 and perforation 49 to the slave cylinders of the brakes of each one of the wheels, this urging the brake shoes to enter into contact with the brake drums, before valve 56-50 becomes closed.

By varying the diameter of perforation 71, and inasmuch as cone shaped portion 82 adapts itself to any one of a plurality of different diameters, it is possible to vary the force that will separate cone shaped portion 82 from the valve seat defined around perforation 71. By a mere variation of the diameter of perforation 71 it is possible to vary the effective displacement of the pedal in accordance with the particular requirements of the conductor.

It is also to be noted, such as was pointed out above, that it is possible to vary the longitudinal position of plug shaped member 70 within section 13', and therefore the elastic effect of spring 59, and accordingly the effective braking displacement of the brake pedal which depends thereon.

In this way, it is to be noted that perforation 71 and cone shaped portion 82 constitute means which being associated with first piston 63' are adapted to retard the closing of the valve constituted by valve seat 50 and valve head 56, with respect to the moment of generation of fluid pressure in the master cylinder 2 upon actuation of brake pedal 9.

It will be understood that improvements may be introduced into the embodiment described by way of example and modifications may be made in the construction and material employed without departing from the scope of the invention specifically defined in the following claims.

I claim:

1. A booster for a hydraulic brake arrangement and the like, connectable between a master cylinder and at least one slave cylinder, comprising a first cylinder having at one end portion thereof a first port adapted to be connected to said master cylinder; a second cylinder having at one end portion thereof a second port also adapted to be connected to said master cylinder, and at the opposite end portion thereof a third port connectable to said slave cylinder; a first piston slidably mounted in said first cylinder and a second piston slidably mounted in said second cylinder, said second piston having a perforation communicating said second port with said third port; a valve seat defined in said second piston around said perforation, said valve seat facing the end portion of said second cylinder which has said second port; a valve rod; a valve head defined at one end of said valve rod and adapted to enter into sealing contact with said valve seat, the other end of said valve rod being connected to said first piston whereby said valve head is positioned controlled by said first piston, and elastic means urging said first piston towards the end portion of said first cylinder that includes said first port.

2. A booster for a hydraulic brake arrangement and the like, connectable between a master cylinder and at least one slave cylinder, comprising a first cylinder having at one end portion thereof a first port adapted to be connected to said master cylinder; a second cylinder having at one end portion thereof a second port also adapted to be connected to said master cylinder, and at the opposite end portion thereof a third port connectable to said slave cylinder; a first piston slidably mounted in said first cylinder and a second piston of larger diameter than said first piston, slidably mounted in said second cylinder, said second piston having an axial perforation in communication with said third port, a radial perforation in communication with said axial perforation and an annular peripheral recess into which said radial perforation extends, said annular recess being permanently in communication with said second port, said axial perforation including a first portion and a second portion of smaller diameter than said first portion; a valve seat defined between the first and second portions of said axial perforation, said valve seat facing the end portion of said second cylinder which has said second port; a valve rod; a valve head defined at one end of said valve rod and adapted to enter into sealing contact with said valve seat, the other end of said valve rod being connected to said first piston whereby said valve head is positioned controlled by said first piston, and elastic means urging said first piston towards the end portion of said first cylinder that includes said first port.

3. A booster for a hydraulic brake arrangement and the like, connectable between a master cylinder and at least one slave cylinder, comprising a first cylinder having at one end portion thereof a first port adapted to be connected to said master cylinder; a second cylinder having at one end portion thereof a second port also adapted to be connected to said master cylinder, and at the opposite end portion thereof a third port connectable to said slave cylinder; a first piston slidably mounted in said first cylinder and a second piston of smaller diameter than said first piston slidably mounted in said second cylinder, said second piston having a perforation communicating said second port with said third port; a valve seat defined in said second piston around said perforation, said valve seat facing the end portion of said second cylinder which has said second port; a valve rod connected by one end to said first piston and having a valve head defined at the other end thereof and adapted to enter into sealing contact with said valve seat, whereby said valve head is position controlled by said first piston, means associated with said first piston for retarding the closing of said valve seat and valve head with respect to the generation of fluid pressure in said master cylinder; and elastic means urging said first piston towards the end portion of said first cylinder that includes said first port.

References Cited

UNITED STATES PATENTS

| | | | |
|---|---|---|---|
| 2,470,748 | 5/1949 | Thomas et al. | 60—54.5 |
| 3,130,551 | 4/1964 | Chouings | 60—54.5 |

MARTIN P. SCHWADRON, *Primary Examiner.*

R. R. BUNEVICH, *Assistant Examiner.*